(12) United States Patent
Sharma et al.

(10) Patent No.: US 10,838,952 B2
(45) Date of Patent: Nov. 17, 2020

(54) RESOURCE OFFLOADING PROCESS USING MACHINE LEARNING FOR DATABASE

(71) Applicant: Bank of America Corporation, Charlotte, NC (US)

(72) Inventors: Anirudh Kumar Sharma, Gurgram (IN); Magaranth Jayasingh, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 211 days.

(21) Appl. No.: 16/238,962

(22) Filed: Jan. 3, 2019

(65) Prior Publication Data

US 2020/0218717 A1 Jul. 9, 2020

(51) Int. Cl.
*G06F 16/242* (2019.01)
*G06F 16/2457* (2019.01)
*G06F 16/28* (2019.01)
*G06N 20/00* (2019.01)

(52) U.S. Cl.
CPC .... *G06F 16/2425* (2019.01); *G06F 16/24578* (2019.01); *G06F 16/285* (2019.01); *G06N 20/00* (2019.01)

(58) Field of Classification Search
CPC .............. G06F 16/2425; G06F 16/285; G06F 16/24578; G06N 20/00
See application file for complete search history.

(56) References Cited

U.S. PATENT DOCUMENTS

| 7,689,682 | B1 * | 3/2010 | Eldering ............... G06Q 40/00 709/223 |
| 9,111,012 | B2 | 8/2015 | Fu et al. |
| 9,460,189 | B2 | 10/2016 | Meijer |
| 9,607,063 | B1 | 3/2017 | Cao et al. |
| 9,727,600 | B2 | 8/2017 | Fu et al. |
| 9,904,694 | B2 | 2/2018 | Cao et al. |
| 2003/0078913 | A1 * | 4/2003 | McGreevy ............ G06F 16/334 |
| 2018/0336019 | A1 * | 11/2018 | Schmidt ............... G06F 16/252 |

* cited by examiner

*Primary Examiner* — Cam Y T Truong
(74) *Attorney, Agent, or Firm* — Michael A. Springs (57) ABSTRACT

A resource offloading system comprises a relational database configured to store relational queries including searching features, a server configured to offload the relational queries to non-relational queries, and a non-relational database configured to store the non-relational queries. The server is configured to generate access patterns for each relational query based on searching features included in the relational query, classify the access pattern based on a terminology defined by a searching feature into a classification, rank the classified access patterns, generate candidate access patterns from the ranked access patterns, create non-relational queries based on the candidate access patterns which are ranked beyond a threshold, and store the non-relational queries in the non-relational database.

20 Claims, 5 Drawing Sheets

RESOURCE OFFLOADING PROCESS USING MACHINE LEARNING FOR DATABASE

TECHNICAL FIELD

The present disclosure relates generally to offloading data, and more specifically to offloading data selectively to a different model database using machine learning.

BACKGROUND

Due to the rapid development of the internet and an increasing amount of data, a need to offload the data from a relational database to a non-relational database emerges. The relational database stores multiple queries, wherein a specific query can be retrieved by demanding a specific row or column in the table defined in the specific query. A relational query, such as a structured query language (SQL) query, comprises multiple tables which are created by data definition languages (DDLs) and are related to each other. Each table comprises rows and columns which store user ID), history record, filtered information, and the information that a user intends to store. Therefore, the user may retrieve a specific relational query by demanding a specific row, column, or cell from the tables in the query. However, using a specific row or column in the table to locate a desired SQL query in the relational database becomes a hurdle after a conversion into a non-relational database. A user cannot retrieve a specific query from the non-relational database by demanding a specific cell of the information, because the single cell does not link to other information since the non-relational database does not store the information in the related tables. Therefore, a need to create a new management for storing and retrieving data in the non-relational database after a conversion from the relational database arises.

SUMMARY

A relational database has been a major storage solution for most of the enterprises, especially for transaction processing and business intelligence applications. However, due to a need for a flexible management of database and a higher demand of data storage, a non-relational database becomes a trending database solution for storing data because of its variety of data models and its flexible expansion of storage. Nonetheless, there are certain challenges when offloading data from a relational database to a non-relational database. For example, when a user wants to retrieve a specific query in a relational database, the user may select specific columns from a single table or multiple related tables. Each table comprises a column which stores primary keys and foreign keys used to link to a second table. The specific query returned may comprise data included in the selected columns in the related tables, such as customer ID and address. Since the non-relational database does not store data in related tables, the method disclosed herein provides an access pattern which includes one or more searching features to locate a specific query in the non-relational database. These searching features are derived from the original primary keys and the original foreign keys included in the tables in the relational database.

The system disclosed herein provides several technical advantages which include creating non-relational queries from relational queries systematically using a machine learning process, testing the created non-relational queries on both the relational database and the non-relational database, and updating new non-relational queries by testing established non-relational queries. Creating the non-relational queries from the relational queries is an unconventional technique which provides a systematic method to select critical relational queries and creates all possible access patterns to locate a specific non-relational query based on searching features included therein. The created access patterns provide multiple searching routines to access to the specific non-relational query, such that the non-relational query created based on the possible access patterns established allows a faster management in the non-relational database. This facilitates increasing the efficiency for retrieving data in the non-relational database, reducing the response time of the disclosed system, and conserving computing resources and network, resources.

Furthermore, testing the created access patterns by creating test queries to execute on both the relational database and the non-relational database avoids data inconsistencies between the two different model databases, and also remediates the created access pattern by updating a new access pattern which locates a non-relational query based on the inconsistency found during testing.

Unlike traditional methods to retrieve a query in the non-relational database converted from the relational database where the user may retrieve an incorrect query by demanding multiple individual criterion, a modeler using machine learning process to create a non-relational database disclosed herein selects and classifies relational queries in the source database, and creates access patterns for each relational query for a conversion into a non-relational query. A tester disclosed herein further validates the created access pattern and updates newly-detected access patterns based on detected deficiencies for a better performance and efficiency of the non-relational database.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The system disclosed herein provides several technical advantages which include 1) a prioritized mechanism to select relational queries to be converted into non-relational queries, and 2) a retrieval process of a non-relational query established based on access patterns created by the relationship of the primary key and the foreign key in two separate tables of a relational query.

Figure 1:
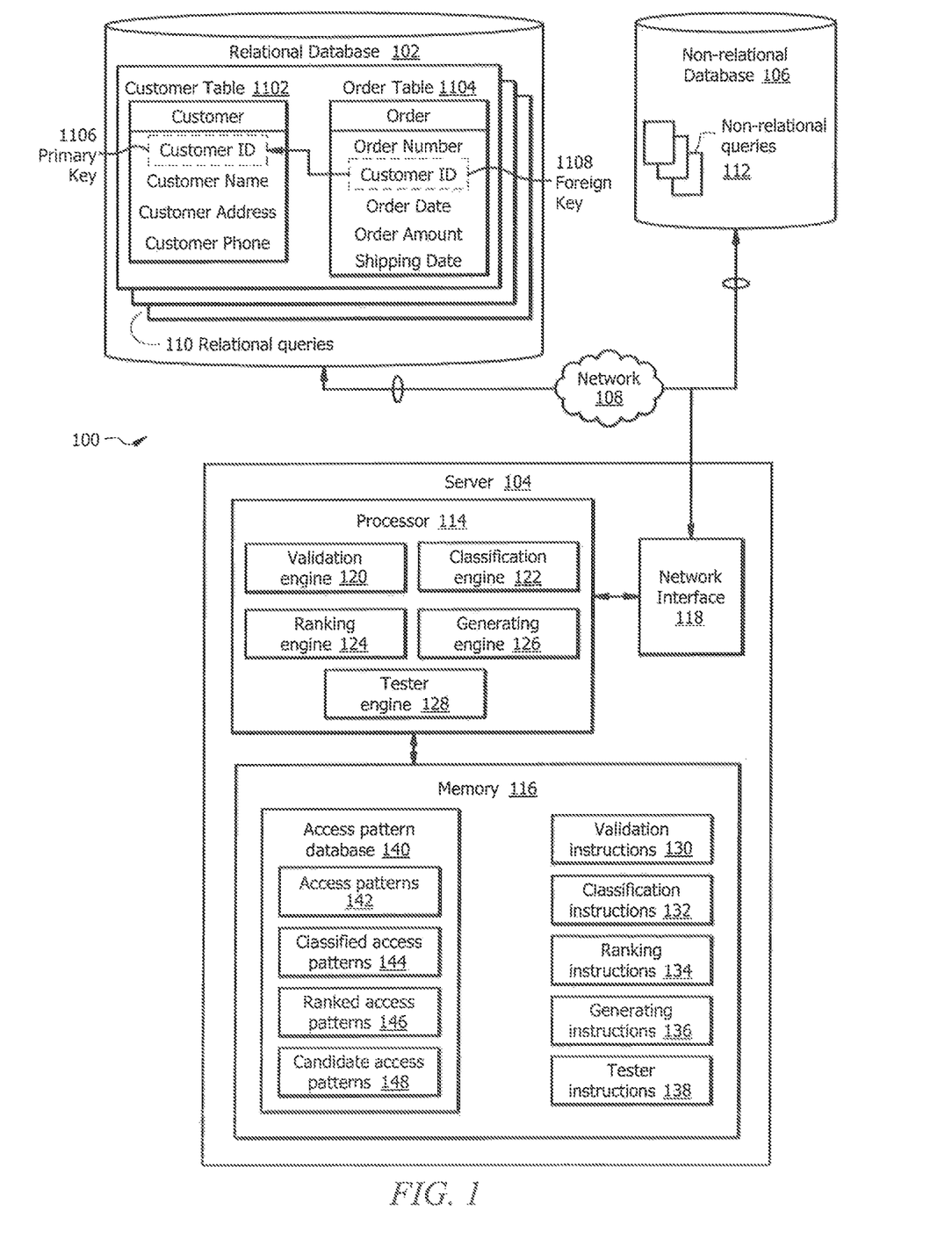
FIG. 1 is a schematic diagram of an embodiment of a system for resource offloading using machine learning processing according to the present disclosure.
Figure 2:
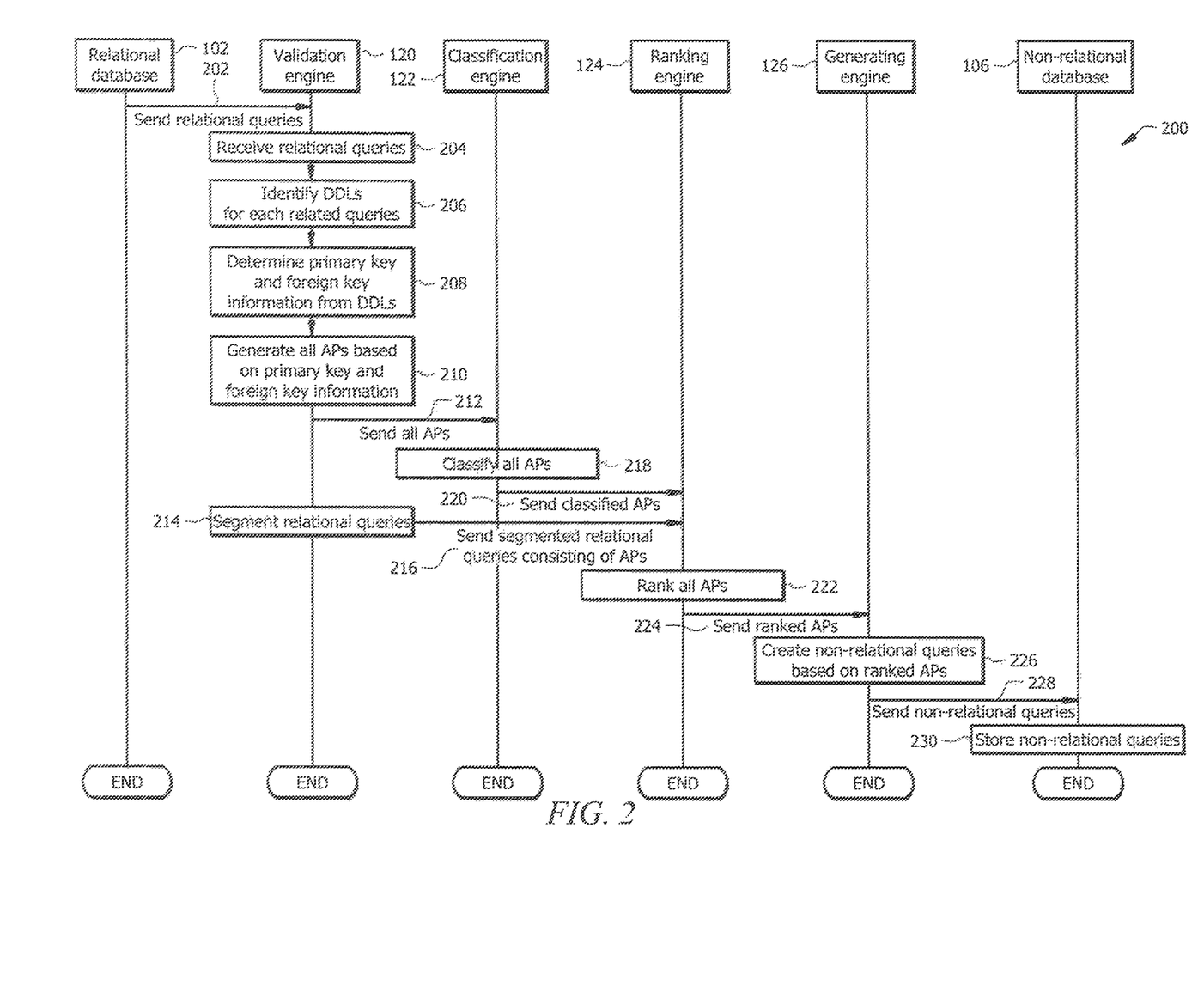
FIG. 2 is a protocol diagram of an embodiment of a server for resource offloading between difference model databases.
Figure 3:
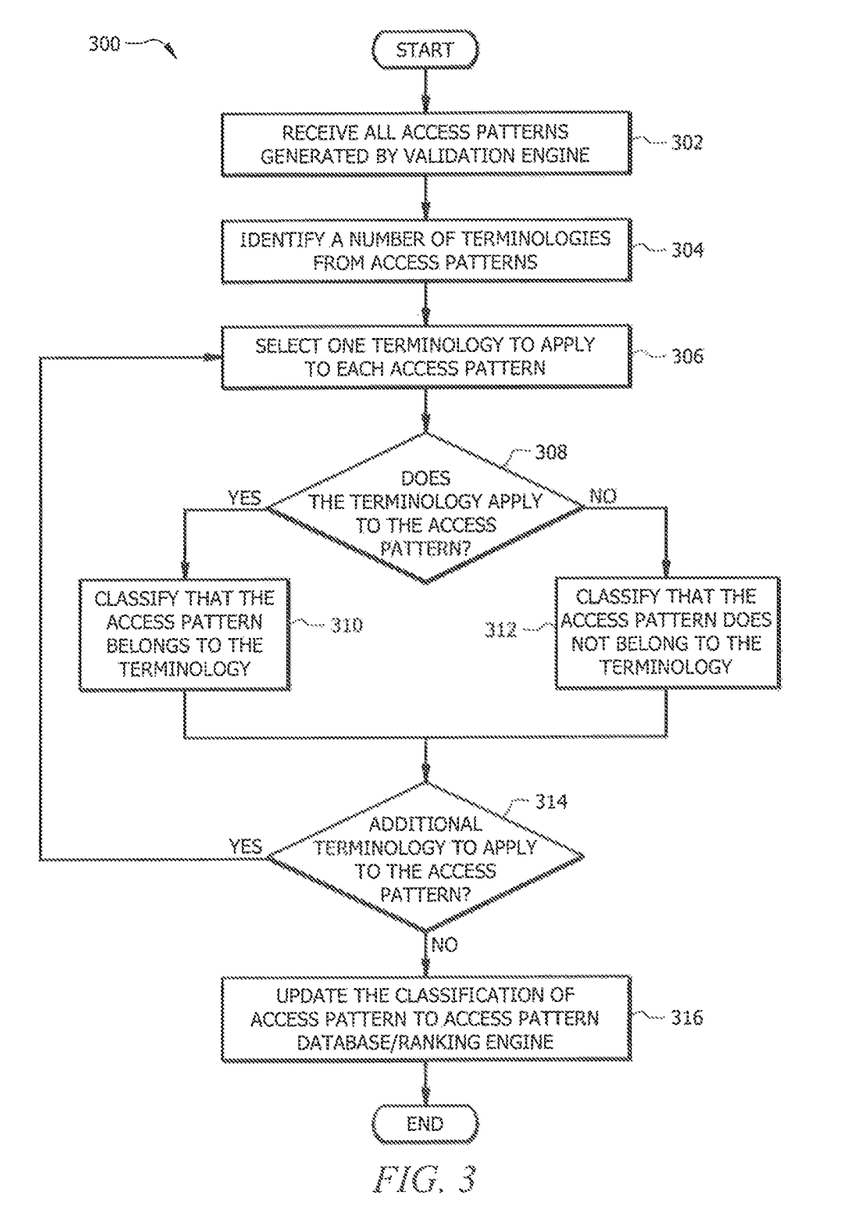
FIG. 3 is a flowchart of an embodiment of a classification engine for classifying an access pattern by each searching feature in the access pattern.
Figure 4:
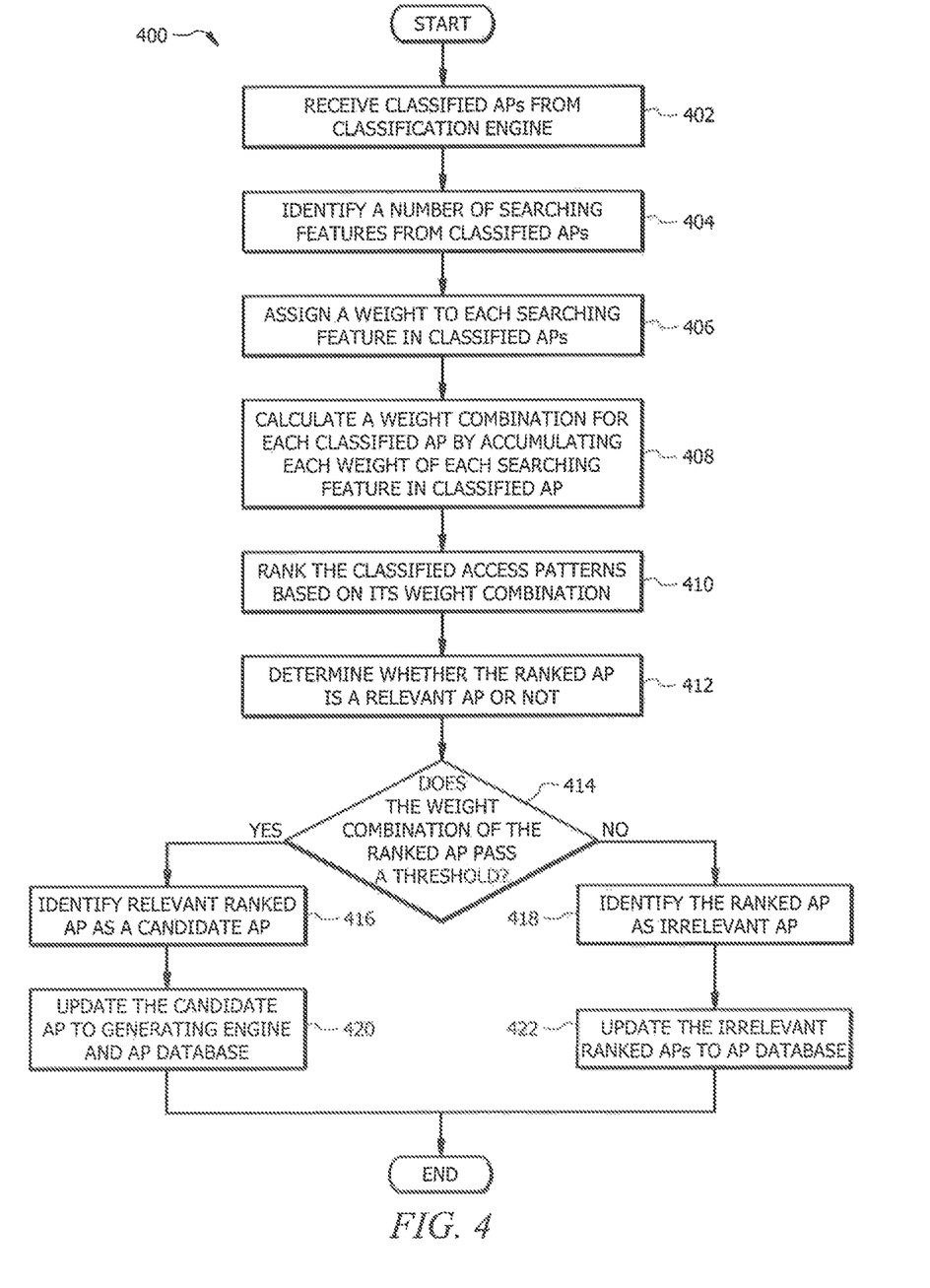
FIG. 4 is a flowchart of an embodiment of a ranking engine for generating candidate access patterns for non-relational queries.
Figure 5:
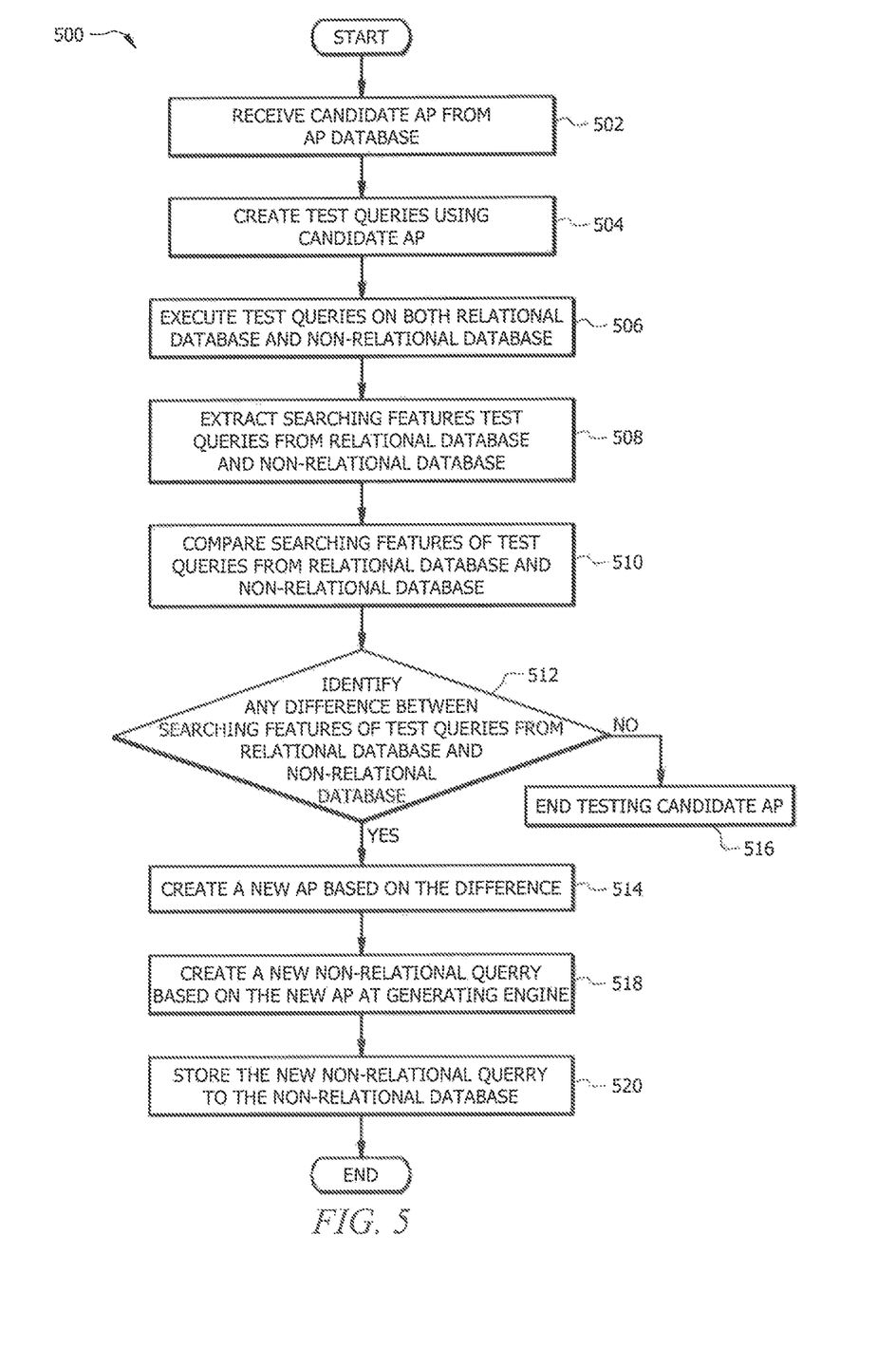
FIG. 5 is a flowchart of an embodiment of a tester engine for validating and updating candidate access patterns.

FIG. 1 is an example of a system for resource offloading using machine learning processing. FIG. 2 is an example of a server for resource offloading between different model databases. FIG. 3 is an example of a classification engine for classifying an access pattern by each searching feature in the access pattern. FIG. 4 is an example of a ranking engine for generating candidate access patterns for non-relational queries. FIG. 5 is an example of a tester engine for validating and updating established access patterns.

FIG. 1 is a schematic diagram of an embodiment of a system 100 for resource offloading using machine learning processing, according to certain embodiments. The system 100 comprises a relational database 102, a server 104, and a non-relational database 106 in signal communication via a network 108. For example, the server 104 may offload data from the relational database 102 and upload processed data to the non-relational database 106 using a network connection. In certain embodiments, the server 104 may communicate with the relational database 102 and the non-relational database 106 via wired communications. The relational database 102 comprises multiple relational queries 110 which are ready to be offloaded to the server 104. The server 104 is configured to offload the relational queries 110 from the relational database 102, to convert the relational queries 110 into non-relational queries 112 using a processor 114, and to upload the non-relational queries 112 to the non-relational database 106.

The network 108 is any suitable type of network operable to support communication between components of the system 100. The network 108 is configured to enable wired and/or wireless communications. For example, the network 108 may include all or a portion of the Internet, a public switched telephone network (PSTN), a public network, a private network, a local area network (LAN), a metropolitan area network (MAN), a wide area network (WAN), or any other suitable type of network. The network 108 may be configured to support any suitable type of communication protocol as would be appreciated by one of ordinary skill in the art upon viewing this disclosure.

The relational database 102 stores the relational queries 110, in which each relational query 110 comprises one or more searching features defined by characteristics of the relational query 110. In certain embodiments, the relational database 102 may be a Structured Query Language (SQL) database and the relational query 110 may be a SQL query comprising tables, columns, data types, and data schemas defined by data definition languages (DDLs). For example, the relational query 110 comprise a customer table 1102 and an order table 1104. The customer table 1102 comprises multiple columns which store customer ID, customer name, customer address, and customer phone number individually. The order table 1104 comprises multiple columns which store order number, customer ID, order date, order amount, and shipping date individually. Among the columns in the customer table 1102, the column of customer ID is a primary key 1106 which is used to relate to the column of customer ID in the order table 1104. That is, the column of customer ID in the order table 1104 is a foreign key 1108 which refers to the primary key 1106 in the customer table 1102. Primary key 1106 and foreign key 1108 included in tables of the SQL query individually are used to define a relation between tables. In certain embodiments, the relational database 102 may be an internal database in the server 104. In certain embodiments, the relational database 102 may be a single external storage device (e.g., disks, solid-state drives).

In FIG. 1, the server 104 comprises a processor 114, a memory 116, and a network interface 118. The network interface 118 may be configured as shown or in any other suitable configuration. The processor 114 comprises one or more processors operably coupled to the memory 116. The processor 114 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 114 may be a programmable logic device, a microcontroller, a microprocessor, or any suitable combination of the preceding. The processor 114 is communicatively coupled to and in signal communication with the memory 116. The one or more processors are configured to process data and may be implemented in hardware or software. For example, the processor 114 may be 8-bit, 16-bit, 32-bit, 64-bit or of any other suitable architecture. The processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a validation engine 120, a classification engine 122, a ranking engine 124, a generating engine 126, and a tester engine 128. In this way, processor 114 may be a special purpose computer designed to implement function disclosed herein. In one embodiment, the validation engine 120, the classification engine 122, the ranking engine 124, the generating engine 126, and the tester engine 128 are each implemented using logic units, FPGAs, ASICs, DSPs, or any other suitable hardware.

The memory 116 comprises one or more disks, tape drives, or solid-state drives, and may be used as an over-flow data storage device, to store programs when such programs are selected for execution, and to store instructions and data that are read during program execution. The memory 116 may be volatile or non-volatile and may comprise read-only memory (ROM), random-access memory (RAM), ternary content-addressable memory (TCAM), dynamic random-access memory (DRAM), and static random-access memory (SRAM). The memory 116 is operable to store validation instructions 130, classification instructions 132, ranking instructions 134, generating instructions 136, tester instructions 138, and/or any other data or instructions. The memory 116 also comprises an access pattern database 140 operable to store access patterns 142, classified access patterns 144, ranked access patterns 146, and candidate access patterns 148. The validation instructions 130, the classification instructions 132, the ranking instructions 134, the generating instructions 136, and the tester instructions 138 may comprise any suitable set of instructions, logic, rules, or code operable to execute the validation engine 120, the classification engine 122, the ranking engine 124, the generating engine 126, and the tester engine 128, respectively. A validation method performed by the validation engine 120 is further described in FIG. 2. A classification method performed by the classification engine 122 is further described in FIG. 3. A ranking method performed by the ranking engine 124 is further described in FIG. 4. A tester method performed by the tester engine 128 is further described in FIG. 5.

The network interface 118 is configured to enable wired and/or wireless communications. The network interface 118 is configured to communicate data between the relational database 110, the server 104, and the non-relational database 112 in the system 100 and/or any other system or domain. For example, the network interface 118 may comprise a WIFI interface, a local area network (LAN) interface, a wide area network (WAN) interface, a modem, a switch, or a router. The processor 104 is configured to send and receive data using the network interface 118. The network interface 118 may be configured to use any suitable type of communication protocol as would be appreciated by one of ordinary skill in the art.

In FIG. 1, the validation engine 120, the classification engine 122, the ranking engine 124, the generating engine 126, the tester engine 128, and the access pattern database 140 are as shown as being implemented in a single server device 104. In other examples, the validation engine 120, the classification engine 122, the ranking engine 124, the generating engine 126, the tester engine 128, and the access pattern database 140 may be implemented by any suitable number of servers implemented using distributed network nodes.

Resource Offloading Process Between Two Model Databases

FIG. 2 illustrates a protocol diagram of an embodiment of a server for resource offloading between different model databases, according to certain embodiments. For example, method 200 may be implemented by the system 100 to offload the relational queries 11 from the relational database 102, to generate the non-relational queries 112 at the server 104, and to upload the non-relational queries 112 to the non-relational database 112.

At step 202, the relational database 102 sends the relational queries 110 to the validation engine 120. The relational query 110 comprises one or more searching features defined by characteristics of the relational query 110. In certain embodiments, the relational query 110 may be a SQL query which comprises tables, columns, and data types defined by data definition languages (DDLs). Primary key 1106 and foreign 1108 key included in tables of the SQL query individually are used to define a relationship between tables. Examples of tables include, but are not limited to, a username, a department number, an employer ID, an employer number, historical records, or any other suitable type of filter conditions.

At step 204, the validation engine 120 receives the relational queries 110 from the relational database 102. At step 206, the validation engine 120 identifies each relational query 110 by reading its DDLs to identify tables in the relational query 110. For example, the DDLs in a relational query are used to define columns in the tables, such as creating tables by the CREATE TABLE command. Therefore, by reading the DDLs in each relational query 110, the validation engine 120 may recognize data in each column in the table in the relational query 110. At step 208, the validation engine 120 determines a relationship between the tables using primary key 1106 and foreign key 1108 defined in the relational query 110 by reading its DDLs. For example, when the primary key 1106 in the customer table is customer ID which is related to the customer ID, i.e. the foreign key, in the order table, the validation engine 120 may recognize a relationship between two tables is a customer and an order that the customer made.

At step 210, the validation engine 120 generates access patterns 142 for the relational queries 110 based on identified tables and an identified relationship of the tables. In certain embodiments, the access pattern 142 may be a searching route to locate a specific query based on its searching features, e.g. the information in the related tables which are related with each other via the primary keys 1106 and the foreign keys 1104, in the original relational query. For example, when a user tries to retrieve an employer A's profile, an access pattern 142 to the employer A may be the username of the employer A, the employer number of the employer A, or the department number of the employer A, and a past transaction made by the employer A. At step 212, the validation engine 120 sends all possible access patterns 142 generated for the relational queries 110 to the classification engine 122. In certain embodiments, the validation engine 122 may update the access patterns 142 to the access pattern database 140 under a subfolder of access patterns 142.

Additionally, at step 214, the validation engine 120 may also segment the relational queries 110 which consist of the access patterns 142 from the relational queries which do not consist of the access patterns 142. In certain embodiments, the validation engine 120 may determine that specific access patterns 142 are configured to relate to a specific relational query, and bond the specific access patterns 142 to the specific relational query. At step 216, the validation engine 120 sends the access patterns 142 which are included in the segmented relational queries to the ranking engine 124. In certain embodiments, the validation engine 122 may update the access patterns 142 which are included in the segmented relational queries to the access pattern database 140 under a subfolder of classified access patterns 144.

At step 218, the classification engine 122 receives the access patterns 142 from the validation engine 120 and classifies the access patterns 142 into different categories. For example, a relational query may have three searching features in its access pattern 142. The first searching feature may be an employer ID, and thus, the relational query may be classified as "an employer", instead of a customer. The second searching feature may be a department number, and thus, the relational query may be classified as "Department A" based on the department number. The third searching feature may be a past transaction, and thus, the relational query may be classified as "a financial action." A detailed classification method is further described in FIG. 3. At step 220, the classification engine 122 sends the classified access patterns 144 to the ranking engine 124.

At step 222, the ranking engine 124 receives the classified access patterns 144 from the classification engine 122 and the access patterns 142 which are included in the segmented relational queries from the validation engine 120. The ranking engine 124 ranks the access patterns 142 by assigning weight to each searching feature included in the access pattern and accumulating each weight of the searching feature in the access pattern. When a weight combination of the access pattern passes a threshold, the access pattern may be ranked as a relevant access pattern and be considered as a candidate access pattern for generating a non-relational query. A detailed ranking method is further described in FIG. 4. At step 224, the ranking engine 124 sends candidate access patterns 148 to the generating engine 126.

At step 226, the generating engine 126 receives the candidate access patterns 148 from the ranking engine 124, and generates non-relational queries 112 based on the candidate access patterns 148. The generating engine 126 generates the non-relational queries 112 by creating DDLs that correspond to the candidate access patterns 148. For example, if the candidate access pattern 148 comprises three searching features including customer ID, order date, and shipping date, the generating engine 126 may, define these searching features via DDLs to generate the candidate access pattern 148 for the non-relational query. At step 228, the generating engine 126 uploads the non-relational queries 112 to the non-relational database 106.

At step 230, the non-relational database 106 receives the non-relational queries 112 and stores the non-relational queries 112. In certain embodiments, the non-relational queries 112 may be stored at an internal memory of the server 104 or any other suitable data storage device (e.g., disks, solid-state drives).

Classification Process at Classification Engine

FIG. 3 is a flowchart of an embodiment of a classification engine for classifying each access pattern by its searching feature, according to certain embodiments. A classification process 300 for classifying an access pattern 142 starts at step 302 with receiving all access patterns 142 generated by the validation engine 120 at the classification engine 122.

At step 304, the classification engine 122 identifies a number of terminologies defined by the searching features in the access patterns 142. In certain embodiments, a terminology may be determined or defined by one or more searching features. For example, the terminology may be "an employer" when the access pattern 142 includes a searching feature of "employer ID."

At step 306, the classification engine 122 selects one terminology to apply to each of the searching features in the access pattern 142. For example, the classification engine 122 selects a first terminology "banking statement" to be applied to an access pattern 142 to see whether this first terminology "banking statement" applies to the access pattern 142.

At step 308, the classification engine 122 determines whether the one terminology applies to the searching feature in the access patterns 142. For example, the classification engine 122 determines whether each searching feature in the access patterns 142 comprise "banking account", "transaction number", or "branch name of a bank" which were used to define a terminology "banking statement" when applying the terminology of "banking statement". The classification engine 122 proceeds to step 310 in response to determining that the terminology applies to the searching feature in the access pattern 142. The classification engine 122 proceeds to step 312 in response to determining that the terminology does not apply to the searching feature in the access pattern 142.

At step 314, the classification engine 122 determines whether there is additional terminology that needs to be applied to the access patterns 142. For example, if the classification engine 122 determines a number of X terminology from the access patterns 142, the classification engine 122 may perform step 308 for X times. The classification engine 122 proceeds to step 316 in response to determining there is no additional terminology that needs to be applied to the access pattern 142. The classification engine 122 proceeds back to step 306 in response to determining there are one or more terminologies that need to be applied to the access pattern 142.

At step 316, the classification engine 122 updates the classified access patterns 144 to the ranking engine 124 and/or the access pattern database 140 under the subfolder of classified access patterns 144. In certain embodiments, the classification engine 122 may store the classified access patterns 144 at an external storage device that is in signal communication with the server 104.

Ranking Process at Ranking Engine

FIG. 4 a flowchart of an embodiment of a ranking engine for generating candidate access patterns for non-relational queries, according to certain embodiments. A ranking process 400 for ranking the classified access patterns 144 starts at step 402 with receiving the classified access patterns 144 from the classification engine 122. In certain embodiments, the classified access patterns 144 may be retrieved from the subfolder of the classified access patterns 144 in the access pattern database 140.

At step 404, the ranking engine 124 identifies a number of searching features in the classified access patterns 144.

At step 406, the ranking engine 124 assigns a weight to each searching feature in the classified access patterns 144. In one embodiments, the ranking engine 124 may define a weight linear function based on an aggregation of data using machine learning process. For example, the ranking engine 124 may select a linear function based on the relational queries 110 and optimize the value of each weight for each searching feature, such as the attribute in a SQL query, to be applied to the linear function. In another embodiment, users may define weight to each searching feature based on the characteristics of their purpose to convert a relational database. For example, the user may define a higher weight to the searching features which relate to banking if the user is at the financial department.

At step 408, the ranking engine 124 calculates a weight combination for each classified access pattern 144 by accumulating each weight of each searching feature in the classified access pattern 144. In one embodiment, the ranking engine 124 may apply the optimized weight of each searching feature in the classified access pattern 144 to the selected linear function at step 406 to calculate the weight combination. In another embodiment, a classified access pattern 144 may have multiple searching features, such as "an employer ID", "a department number", and "banking statement", which have been assigned weight individually. The ranking engine 124 may accumulate the weight combination by adding the weights of these searching features.

At step 410, the ranking engine 124 ranks the classified access patterns 144 based on their weight combination to generate ranked access patterns 146. In one embodiment, the ranking engine 124 may apply the optimized weight of each searching feature in the classified access patterns 144 to the selected linear function and identify how close the weight combination of the relational query 110 is to the selected linear function. In another embodiment, the ranking engine 124 may rank the classified access pattern 144 based on a total score of the weight combination of the classified access pattern 144. In certain embodiments, the ranking engine 124 may update the ranked access patterns 146 to the access pattern database 140 under subfolders of ranked access patterns 146.

At step 412, the ranking engine 124 determines whether the ranked access pattern 146 is a relevant ranked access pattern or not. In one embodiment, the ranking engine 124 may determine the ranked access pattern 146 as a relevant ranked access pattern when the ranked access pattern 146 passes the boundary of the selected linear function. In another embodiment, the ranking engine 124 may determine the ranked access pattern 146 as a relevant ranked access pattern when the total score of the weight combination of the ranked access pattern 146 passes a predetermined threshold. In one embodiment, the predetermined threshold may be assigned within the user's discretion.

At step 414, the ranking engine 124 determines whether the weight combination of the ranked access pattern 146 passes the threshold. The ranking engine 124 proceeds to step 416 in response to determining that the weight combination of the ranked access pattern 146 passes the threshold. The ranking engine 124 proceeds to step 418 in response to determining that the weight combination of the ranked access pattern 146 does not pass the threshold.

At step 416, the ranking engine 124 identifies the ranked access pattern 146 which passes the threshold as a relevant ranked access pattern, and considers the relevant ranked access pattern as a candidate access pattern 148 for generating a non-relational query. At step 420, the ranking engine 124 updates the candidate access patterns 148 to the generating engine 126 and/or to the access pattern database 140 under subfolders of candidate access patterns 148. In certain embodiments, the user may review the ranked access patterns 146 and the candidate access patterns 148 before updating the candidate access patterns 148 to the generating engine 126.

At step 418, the ranking engine 124 identifies the ranked access pattern 146 which does not pass the threshold as an irrelevant ranked access pattern 146. At step 422, the ranking engine 124 updates the ranked access patterns 146 which are irrelevant to the access pattern database 140 under subfolders of ranked access patterns 146. In certain embodiments, the user may review the ranked access patterns 146 before updating to the access pattern database 140.

Test Process

FIG. 5 is a flowchart of an embodiment of a tester engine for validating and updating candidate access patterns, according to certain embodiments. A test process 500 for testing the candidate access patterns 148 starts at step 502 with receiving the candidate access patterns 148 from the subfolder of the candidate access patterns 148 in the access pattern database 140. In certain embodiments, the candidate access patterns 148 may be received from the ranking engine 124.

At step 504, the tester engine 128 creates test queries using the candidate access patterns 148. For example, the tester engine 128 randomly selects a candidate access pattern 148 from the access pattern database 140 to create a test query.

At step 506, the tester engine 128 executes the test query on both the relational database 102 and the non-relational database 106. At step 508, the test engine 128 may retrieve a specific query from the relational database 102 and the non-relational database 106 individually using the candidate access pattern 148 selected at step 504. For example, the test query comprises the candidate access pattern 148 selected at step 504. The tester engine 128 may identify the primary key 1106 and the foreign key 1108 by reading the DDLs in the candidate access patterns 148. By using the primary key 1106 and the foreign key 1108, the tester engine 128 may locate the related tables for the specific query in the relational database 102. On the other hand, the tester engine 128 may retrieve a specific query from the non-relational database 106 which correspond to the test query. In certain embodiments, the specific query retrieved from the relational database 102 may correspond to the specific query retrieved from the non-relational database 106.

At step 510, the tester engine 128 compares the test query with the specific query retrieved from the relational database 102 and the specific query retrieved from the non-relational database 106 individually.

At step 512, the tester engine 128 identifies whether there is a difference between the searching features included in the test query and the searching features retrieved from the relational database 102 and the non-relational database 106 individually. In one embodiment, a test query of locating a shipping date comprises a candidate access pattern which is derived from the relationship between the primary key 1106 of the customer ID in the customer table 1102 and the foreign key 1108 of the customer ID 1108 in the order table 1108. The tester engine 128 may, therefore, locate the customer table 1102 and the order table 1104 via the primary key 1106 and the foreign key 1108, and furthermore, identify the searching features in the customer table 1102 and the order table 1104. If the test query of locating a shipping date does not apply to any of the searching features in the customer table 1102 and the order table 1104, there is a difference between the test query and the specific query retrieved from the relational database 102. In another embodiment, the tester engine 128 may compare the candidate access pattern 146 in the specific query retrieved from the non-relational database 106 with the candidate access pattern 146 in the test query. If the candidate access pattern 146 in the test query is different the candidate access pattern 146 in the specific query retrieved from the non-relational database 106, there is a difference between the test query and the specific query retrieved from the non-relational database 106. The tester engine 128 proceeds to step 514 in response to determining that there is a difference between the test query and the specific query retrieved from the relational database 102 and/or the non-relational database 106. The tester engine 128 proceeds to step 516 in response to determining that there is no difference between the test query and the specific retrieved from the relational database 102 and/or the non-relational database 106. In certain embodiments, the user may review the difference before proceeding to step 514 or step 516. For example, the user may decide not to proceed with step 514 when there is a difference.

At step 514, the tester engine 128 creates a new access pattern based on the difference. In one embodiment, the specific query retrieved from the relational database 102 may comprises a different searching feature which does not correspond to any of the searching features identified at step 512 in the test query. The tester engine 128 may create a new access pattern based on the different searching feature. In another embodiment, the candidate access pattern 146 in the specific query retrieved from the non-relational database 112 may be different from the candidate access pattern 146 in the candidate access pattern 146 in the test query. The tester engine 128 may create a new access pattern based on the difference.

At step 518, the tester engine 128 sends the new access pattern to the generating engine 126 and creates a new non-relational query based on the new access pattern at the generating engine 126. In certain embodiments, the tester engine 128 may update the new access pattern to the subfolder of candidate access pattern 148 in the access pattern database 140.

At step 520, the generating engine 126 sends the new non-relational query to the non-relational database 106. The non-relational database 106 stores the new non-relational query. In certain embodiments, the non-relational database 106 may be an internal database in the server 104. In certain embodiments, the non-relational database 106 may be a single external storage device (e.g., disks, solid-state drives).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A resource offloading system comprising:
    a first database configured to store relational queries including searching features, wherein the searching features comprise user identifiers, and filter conditions;
    a server comprising engines configured to process candidate access patterns and an internal memory configured to store data and engine-executable instructions, wherein an access pattern of the candidate access patterns is a searching routine using one or more searching features to locate a relational query, the engine-executable instructions when executed by the engines, causes the server to:
    generate access patterns for each relational query of the relational queries individually based on the one or more searching features in the relational query;
    classify the access patterns based on one or more terminologies into a classification, wherein the terminology is defined based on a searching feature of the searching features;
    rank the classified access patterns by:
        assigning a weight to each searching feature of the searching features in the access patterns; and
        calculating a weight combination for each classified access pattern of the classified access patterns based on the assigned weight to said each searching feature, wherein the weight combination is a total weight which combines every assigned weight of the searching features in a classified access pattern, wherein the classified access patterns are ranked by the weight combinations;
    generate candidate access patterns from the ranked classified access patterns by determining each ranked classified access pattern of the ranked classified access patterns as relevant; wherein the ranked classified access pattern is considered as relevant when the weight combination of the ranked classified access pattern passes a threshold; and
    create non-relational queries based on the generated candidate access patterns which are relevant, wherein a non-relational query of the non-relational queries is accessible via one or more searching features in the generated candidate access patterns; and
    a second database configured to store the non-relational queries, the second database is different from the first database.

2. The system according to claim 1, wherein the server further comprises a tester engine configured to test the candidate access patterns, wherein testing a candidate access pattern comprises:
    generating a test query using the candidate access patterns, wherein the test query is generated by selecting randomly one or more searching features in the candidate access patterns;
    executing the test query on the first database and the second database;
    extracting test access patterns for the test query from the first database and the second database;
    identifying a difference between the test access patterns for the test query from the first database and the second database, wherein the difference indicates that the test access patterns from the first database do not match to the test access patterns from the second database;
    creating a new query based on the difference; and updating the new query to the second database.

3. The system according to claim 1, wherein the server comprises a validation engine configured to generate the access patterns for the relational queries individually comprising: receiving the relational queries from the first database; identifying tables comprising searching features in the relational queries; determining primary key and foreign key derived from the tables of the relational queries: and generating the access patterns based on the primary key and the foreign key.

4. The system according to claim 1, wherein the server comprises a classification engine configured to classify the access patterns comprising:
    receiving an access pattern;
    identifying a number of the terminologies defined by the searching features in the access pattern;
    selecting one terminology to apply to the searching feature in the access pattern;
    determining whether the terminology applies to each searching feature of the searching features in the access pattern individually;
    classifying that the access pattern into the classification based on each determination of each searching feature of the searching features in the access pattern; and
    updating the classification of the access pattern.

5. The system according to claim 4, wherein the classification engine further updates the classified access patterns to the internal memory.

6. The system according to claim 1, wherein the server comprises a ranking engine configured to rank the classified access patterns comprising:
    receiving the classified access patterns;
    identifying a number of the searching features from the classified access patterns;
    assigning weight to each searching feature in the classified access patterns;
    calculating a weight combination for each classified access pattern of the classified access patterns by accumulating each weight of each searching feature in the classified access pattern;
    ranking the classified access pattern based on its weight combination;
    determining the ranked classified access pattern as relevant when the weight combination of the ranked classified access pattern passes the threshold; and
    updating the relevant ranked classified access pattern.

7. The system according to claim 6, wherein the ranking engine further updates the relevance of the ranked classified access patterns to the internal memory.

8. A server for offloading resource comprising:
an internal memory configured to store data and engine-executable instructions;
a validation engine configured to generate access patterns for a relational query by:
receiving the relational query including one or more searching features from a first database that stores relational queries, wherein the searching features comprise user identifiers and filter conditions; and
generating validated access patterns for each relational query of the relational queries individually based on the one or more searching features in the relational query, wherein a validated access pattern of the validated access patterns is a searching routine using the one or more searching features to locate a relational query;
a classification engine configured to classify the validated access patterns based on one or more terminologies into a classification, wherein the terminology is defined based on a searching feature of the searching features;
a ranking engine configured to rank the classified validated access patterns by:
assigning a weight to each searching feature in the classified validated access patterns; and
calculating a weight combination for each classified validated access pattern of the classified validated access patterns based on the assigned weight to said each searching feature, wherein the weight combination is a total weight which combines every assigned weight of the searching features in a classified access pattern, wherein the classified validated access patterns are ranked by the weight combinations; and
a generating engine configured to generate candidate access patterns from the ranked classified validated access patterns by determining each ranked classified validated access pattern of the ranked classified validated access patterns as relevant, wherein the ranked classified validated access pattern is considered as relevant when the weight combination of the ranked classified validated access pattern passes a threshold,
create non-relational queries based on the generated candidate access patterns which are relevant, wherein a non-relational query of the non-relational queries is accessible via one or more searching features in the candidate access patterns and store the non-relational queries in a second database, wherein the second database is different from the first database.

9. The server according to claim 8, wherein the server further comprises a tester engine configured to test the candidate access patterns by:
generating a test query using the candidate access patterns, wherein the test query is generated by selecting randomly one or more searching features in the candidate access patterns;
executing the test query on the first database and the second database;
extracting test access patterns for the test query from the first database and the second database;
comparing a difference between the test access patterns for the test query from the first database and the second database, wherein the difference indicates that the test access patterns from the first database do not match to the test access patterns from the second database;
identifying a new query based on the difference; and
updating the new query to the second database.

10. The server according to claim 8, wherein the validation engine further configured to:
receive the relational queries from the first database;
identify tables comprising searching features in the relational queries;
determine primary key and foreign key derived from the tables of the relational queries; and
generate the access patterns based on the primary key and the foreign key.

11. The server according to claim 8, wherein the classification engine further configured to:
receive access pattern;
identify a number of the terminologies defined by the searching features in the access pattern;
select one terminology to apply to each searching feature of the searching features in the access pattern;
determine whether the one terminology applies to each searching feature of the searching features in the access pattern individually;
classify that the access pattern into the classification based on each determination of each searching feature of the searching features in the access pattern; and
update the classification of the access pattern.

12. The server according to claim 11, wherein the classification engine further updates the classified access patterns to the internal memory.

13. The server according to claim 8, wherein the ranking engine further configured to:
receive classified access patterns;
identify a number of the searching features from the classified access patterns;
assign the weight to each searching feature in the classified access patterns;
calculate a weight combination for each classified access pattern of the classified access patterns by accumulating each weight of each searching feature in the classified access pattern;
rank the classified access pattern based on its weight combination;
determine the ranked classified access pattern as relevant or irrelevant when the weight combination of the ranked classified access pattern passes the threshold; and
update the relevant of the ranked classified access pattern and the irrelevant ranked classified access pattern.

14. The server according to claim 13, wherein the ranking engine further updates a relevance of the ranked classified access patterns to the internal memory.

15. A method for offloading resource comprising:
receiving, by a processor, relational queries including one or more searching features from a first database wherein the searching features comprise user identifiers and filter conditions;
generating, by the processor, validated access patterns for each relational query of the relational queries individually based on the one or more searching features in the relational query, wherein a validated access pattern of the validated access patterns is a searching routine using the one or more searching features to locate a relational query;
classifying, by the processor, the validated access pattern based on one or more terminologies into a classification, wherein the terminology is defined based on a searching feature of the searching features;

ranking, by the processor, the classified validated access patterns by:
  assigning a weight to each searching feature of the searching features in the validated access patterns; and
  calculating a weight combination for each classified validated access pattern of the classified validated access patterns based on an assigned weight to said each searching feature, wherein the weight combination is a total weight which combines every assigned weight of the searching features in a classified validated access pattern, wherein the classified validated access patterns are ranked by the weight combinations; and
generating candidate access patterns from the ranked classified validated access patterns by determining each ranked classified validated access pattern of the ranked classified validated access patterns as relevant, wherein the ranked classified validated access pattern is considered as relevant when the weight combination of the ranked classified validated access pattern passes a threshold;
creating, by the processor, non-relational queries based on the candidate access patterns which are relevant, wherein a non-relational query of the non-relational queries is accessible via one or more searching features in the candidate access patterns; and
storing, by the processor, the non-relational queries in a second database, wherein the second database is different from the first database.

16. The method according to claim 15, wherein the method further comprises testing the candidate access patterns by:
  generating a test query using the candidate access patterns, wherein the test query is generated by selecting randomly one or more searching features in the candidate access patterns;
  executing the test query on the first database and the second database;
  extracting test access patterns for the test query from the first database and the second database:
  identifying a difference between the test access patterns for the test query from the first database and the second database, wherein the difference indicates that the test access patterns from the first database do not match to the test access patterns from the second database;
  creating a different query based on the difference; and
  updating the different query to the second database.

17. The method according to claim 15, wherein generating the validated access patterns for each relational query of the relational queries further comprises:
  identifying tables comprising searching features in the relational queries;
  determining primary key and foreign key derived from the tables of the relational queries; and
  generating the validated access patterns based on the primary key and the foreign key.

18. The method according to claim 15, wherein classifying the validated access pattern further comprises:
  receiving the validated access pattern;
  identifying a number of the terminologies defined by the searching features in the validated access pattern;
  selecting one terminology to apply to each searching feature of the searching features in the validated access pattern;
  determining whether the one terminology applies to each searching feature of the searching features in the validated access pattern individually;
  classifying that the validated access pattern into the classification based on each determination of each searching feature of the searching features in the validated access pattern; and updating the classification of the validated access pattern.

19. The method according to claim 15, wherein ranking the classified access patterns further comprises:
  receiving the classified access patterns;
  identifying a number of the searching features from the classified access patterns;
  assigning the weight to each searching feature in the classified access patterns;
  calculating a weight combination for each classified access pattern of the classified access patterns by accumulating each weight of each searching feature in the classified access pattern;
  ranking the classified access pattern based on its weight combination;
  determining the ranked classified access pattern as relevant or irrelevant by its ranking when the weight combination of the ranked classified access pattern passes the threshold; and
  updating the relevant ranked classified access pattern and the irrelevant ranked access pattern.

20. The method according to claim 15, wherein method further comprises storing the validated access patterns, the classified validated access patterns, the ranked classified validated access patterns, and the candidate access patterns in a memory.

* * * * *